US011823817B2

(12) United States Patent
Hunter et al.

(10) Patent No.: US 11,823,817 B2
(45) Date of Patent: Nov. 21, 2023

(54) COMPOSITE HYBRID CABLES AND METHODS OF MANUFACTURING AND INSTALLING THE SAME

(71) Applicant: Structured Home Wiring Direct, LLC, Mentor, OH (US)

(72) Inventors: Drew Nathan Hunter, Mentor, OH (US); Timothy N. Berelsman, Wapakoneta, OH (US)

(73) Assignee: Structured Home Wiring Direct, LLC, Mentor, OH (US)

( * ) Notice: Subject to any disclaimer, the term of this patent is extended or adjusted under 35 U.S.C. 154(b) by 128 days.

(21) Appl. No.: 17/165,893

(22) Filed: Feb. 2, 2021

(65) Prior Publication Data
US 2021/0241936 A1 Aug. 5, 2021

Related U.S. Application Data

(60) Provisional application No. 62/970,135, filed on Feb. 4, 2020.

(51) Int. Cl.
*H01B 7/00* (2006.01)
(52) U.S. Cl.
CPC .................. *H01B 7/0045* (2013.01)
(58) Field of Classification Search
None
See application file for complete search history.

(56) References Cited

U.S. PATENT DOCUMENTS

| | | | | |
|---|---|---|---|---|
| 3,023,267 A | * | 2/1962 | Eager, Jr. | H01B 7/00 174/115 |
| 3,328,510 A | * | 6/1967 | White | H01B 11/20 174/41 |
| 3,588,336 A | * | 6/1971 | Scher | H04N 7/183 348/E7.078 |
| 3,792,190 A | * | 2/1974 | Schultz | H01B 7/0045 206/390 |
| 3,816,644 A | * | 6/1974 | Giffel | H01B 9/028 174/115 |
| 4,453,291 A | * | 6/1984 | Fidrych | G02B 6/4465 24/122.3 |

(Continued)

FOREIGN PATENT DOCUMENTS

| | | | | |
|---|---|---|---|---|
| CN | 102483973 A | * | 5/2012 | H01B 1/02 |
| CN | 106098208 A | * | 11/2016 | |

(Continued)

OTHER PUBLICATIONS

JP2014519269—translated and original (Year: 2014).*
EP3043357—translated and original (Year: 2017).*
EP2629309—translated and original (Year: 2013).*

*Primary Examiner* — Timothy J. Dole
*Assistant Examiner* — Muhammed Azam
(74) *Attorney, Agent, or Firm* — Johnston IP Law, PLLC

(57) ABSTRACT

A composite hybrid cable includes multiple constituent cables with an outer jacket covering the constituent cables configured to run through a wire chase or wall of a structure in a single pass by pushing. The ends of the constituent cables are of different lengths to form a staggered end with the ends having factory-installed connectors. The ends are covered with a material to form a tapered leading edge to facilitate running the composite hybrid cable.

17 Claims, 4 Drawing Sheets

(56) References Cited

U.S. PATENT DOCUMENTS

| | | | | |
|---|---|---|---|---|
| 4,533,790 A * | 8/1985 | Johnston | H01B 11/1891 | 174/115 |
| 4,761,811 A * | 8/1988 | Zetena, Jr. | H04Q 1/116 | 379/397 |
| 4,800,236 A * | 1/1989 | Lemke | H01B 7/0838 | 156/53 |
| 4,860,343 A * | 8/1989 | Zetena, Jr. | H04Q 1/116 | 379/397 |
| 5,156,355 A * | 10/1992 | Wadle | B65H 57/20 | 242/366.3 |
| 5,220,130 A * | 6/1993 | Walters | H01B 11/20 | 174/120 SR |
| 5,424,587 A * | 6/1995 | Federowicz | H02J 13/00028 | 340/310.18 |
| 5,491,299 A * | 2/1996 | Naylor | A61B 5/303 | 174/105 R |
| 5,659,152 A * | 8/1997 | Horie | H01B 11/04 | 174/128.2 |
| 5,666,452 A * | 9/1997 | Deitz, Sr. | G02B 6/441 | 385/100 |
| 5,834,698 A * | 11/1998 | Izui | H01B 9/003 | 174/117 F |
| 5,956,445 A * | 9/1999 | Deitz, Sr. | G02B 6/4416 | 385/100 |
| 6,114,632 A * | 9/2000 | Planas, Sr. | H01B 9/003 | 174/117 R |
| 6,249,629 B1 * | 6/2001 | Bringuier | G02B 6/4494 | 385/103 |
| 6,259,031 B1 * | 7/2001 | Totland | H01B 11/02 | 174/113 C |
| 6,310,286 B1 * | 10/2001 | Troxel | H01B 11/005 | 174/34 |
| 6,462,268 B1 * | 10/2002 | Hazy | H01B 11/02 | 174/113 R |
| 6,566,606 B1 * | 5/2003 | Hazy | H01B 11/1091 | 174/113 R |
| 7,019,218 B2 * | 3/2006 | Somers | H01B 11/04 | 174/113 C |
| 7,145,080 B1 * | 12/2006 | Boisvert | H01B 11/06 | 174/120 SR |
| 7,166,802 B2 * | 1/2007 | Cusson | H01B 7/20 | 174/105 R |
| 7,173,189 B1 * | 2/2007 | Hazy | H01B 11/04 | 174/113 C |
| 7,203,405 B1 * | 4/2007 | Storaasli | G02B 6/443 | 385/112 |
| 7,271,721 B2 * | 9/2007 | Delahanty | G08B 13/20 | 340/544 |
| 7,515,058 B2 * | 4/2009 | Normand | G08B 21/14 | 340/693.9 |
| 7,595,647 B2 * | 9/2009 | Kroh | H01B 11/20 | 174/115 |
| 8,045,565 B1 * | 10/2011 | Schurig | H02G 9/04 | 333/160 |
| 9,018,529 B2 * | 4/2015 | Sidlyarevich | H01B 7/04 | 174/113 R |
| 9,340,049 B2 * | 5/2016 | Hayashi | B41J 29/393 | |
| 9,355,759 B2 * | 5/2016 | Rivernider | H01B 13/0278 | |
| 9,543,059 B2 * | 1/2017 | Deighton | H01B 7/0072 | |
| 10,002,689 B2 * | 6/2018 | Straniero | H01B 9/028 | |
| 10,008,812 B1 * | 6/2018 | Hamner | H01R 13/6585 | |
| 10,096,953 B1 * | 10/2018 | Finnestad | H01R 13/658 | |
| 10,204,720 B2 * | 2/2019 | Glew | H01B 11/22 | |
| 10,573,431 B2 * | 2/2020 | Lee | H01B 11/005 | |
| 2001/0002773 A1 * | 6/2001 | Hyogo | H01B 9/003 | 307/147 |
| 2002/0053460 A1 * | 5/2002 | Takeda | G02B 6/4416 | 174/117 F |
| 2003/0012606 A1 * | 1/2003 | Van Bijsterveld | G02B 6/504 | 405/184 |
| 2003/0121694 A1 * | 7/2003 | Grogl | H01B 3/441 | 174/113 R |
| 2005/0013566 A1 * | 1/2005 | Storaasli | H02G 9/04 | 385/113 |
| 2005/0103518 A1 * | 5/2005 | Glew | G02B 6/4489 | 174/113 C |
| 2006/0021786 A1 * | 2/2006 | Fetterolf, Sr. | H01B 9/02 | 174/113 R |
| 2006/0021787 A1 * | 2/2006 | Fetterolf, Sr. | H01B 9/003 | 174/113 R |
| 2006/0178030 A1 * | 8/2006 | Lund | A61B 5/0205 | 439/287 |
| 2007/0068697 A1 * | 3/2007 | Orfin | H01B 7/065 | 174/113 R |
| 2007/0103857 A1 * | 5/2007 | Weech | G06F 1/188 | 361/679.34 |
| 2008/0007372 A1 * | 1/2008 | Carroll | H04Q 1/144 | 333/260 |
| 2008/0066947 A1 * | 3/2008 | Glew | G02B 6/4489 | 174/131 A |
| 2009/0074423 A1 * | 3/2009 | Bernard | H04J 3/0682 | 398/135 |
| 2010/0290748 A1 * | 11/2010 | Kojima | H02G 3/266 | 174/70 R |
| 2010/0319956 A1 * | 12/2010 | Ballard | H01B 9/003 | 174/105 R |
| 2010/0321591 A1 * | 12/2010 | Onomatsu | H01B 7/0823 | 348/E5.126 |
| 2011/0211584 A1 * | 9/2011 | Mahmoud | H04L 12/2834 | 370/401 |
| 2012/0103648 A1 * | 5/2012 | Ogura | H01B 7/0045 | 174/34 |
| 2013/0056259 A1 * | 3/2013 | Lettkeman | H01R 25/006 | 174/505 |
| 2014/0086698 A1 * | 3/2014 | Huddleston | H02G 1/06 | 408/226 |
| 2014/0102751 A1 * | 4/2014 | Iwasaki | H01B 13/01263 | 174/107 |
| 2015/0083983 A1 * | 3/2015 | Yi | H02G 1/06 | 254/134.3 R |
| 2015/0185430 A1 * | 7/2015 | Jin | G02B 6/4448 | 174/59 |
| 2016/0078981 A1 * | 3/2016 | Kumada | H01B 9/003 | 174/72 A |
| 2016/0176369 A1 * | 6/2016 | Ito | H01B 9/006 | 174/72 A |
| 2016/0196897 A1 * | 7/2016 | Straniero | H01B 7/0225 | 174/102 R |
| 2017/0092391 A1 * | 3/2017 | Forget | B60R 16/0215 | |
| 2018/0061525 A1 * | 3/2018 | Kohori | H01B 3/447 | |
| 2018/0151271 A1 * | 5/2018 | Sidlyarevich | H02K 11/21 | |
| 2018/0219310 A1 * | 8/2018 | Lukofsky | H01R 12/52 | |
| 2019/0077341 A1 * | 3/2019 | Kohori | H01B 1/026 | |
| 2019/0248308 A1 * | 8/2019 | Hayakawa | H01B 7/041 | |
| 2020/0086751 A1 * | 3/2020 | Heyne | H01B 7/423 | |
| 2020/0118711 A1 * | 4/2020 | Bolde | H05K 9/0098 | |

FOREIGN PATENT DOCUMENTS

| | | | | |
|---|---|---|---|---|
| CN | 106782776 A | * | 5/2017 | |
| CN | 106981325 A | * | 7/2017 | |
| CN | 107958726 A | * | 4/2018 | |
| CN | 108597656 A | * | 9/2018 | H01B 7/0045 |
| CN | 109206787 A | * | 1/2019 | |
| CN | 110098002 A | * | 8/2019 | |
| CN | 112002466 A | * | 11/2020 | |
| EP | 0476961 A3 | * | 9/1991 | |
| EP | 0789429 A2 | * | 2/1997 | |
| EP | 0820168 A2 | * | 1/1998 | |
| EP | 1063656 A3 | * | 7/2002 | G02B 6/4422 |
| EP | 1393984 A1 | * | 3/2004 | B60T 13/74 |
| EP | 2264717 A2 | * | 12/2010 | H01B 7/0823 |
| EP | 2911162 A2 | * | 8/2015 | B61L 7/06 |
| FR | 3017983 A1 | * | 8/2015 | B61L 5/1881 |
| KR | 101447515 B1 | * | 9/2014 | |
| KR | 20140118653 A | * | 10/2014 | |
| KR | 20150023199 A | * | 3/2015 | |
| KR | 20150140512 A | * | 12/2015 | |
| KR | 20160041481 A | * | 4/2016 | |

(56) References Cited

FOREIGN PATENT DOCUMENTS

| WO | WO-9008388 A1 * | 7/1990 | |
|----|----|----|----|
| WO | WO-9833189 A2 * | 7/1998 | ........... H01B 11/005 |
| WO | WO-0137535 A1 * | 5/2001 | ............. H04B 3/542 |
| WO | WO-03029922 A2 * | 4/2003 | ............. B64C 13/20 |
| WO | WO-2006136811 A1 * | 12/2006 | ....... H04B 10/25754 |
| WO | WO-2011008568 A2 * | 1/2011 | ............... H01B 1/02 |
| WO | WO-2020152491 A1 * | 7/2020 | |
| WO | WO-2021082686 A1 * | 5/2021 | ........... G02B 6/4416 |

* cited by examiner

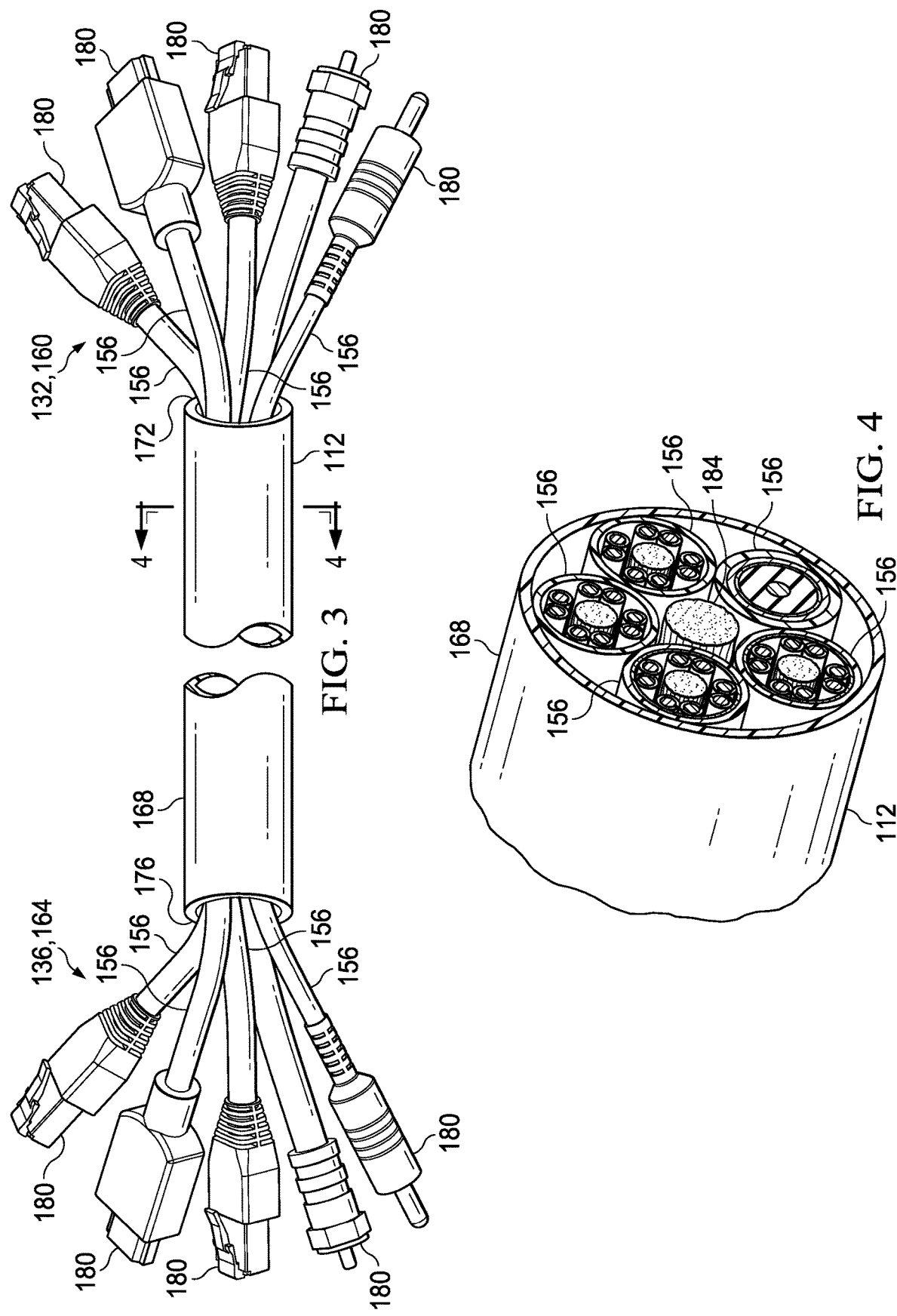

US 11,823,817 B2

COMPOSITE HYBRID CABLES AND METHODS OF MANUFACTURING AND INSTALLING THE SAME

CROSS-REFERENCE TO RELATED APPLICATION

This application claims the benefit of U.S. Provisional Application Ser. No. 62/970,135, filed by Drew Nathan Hunter, et al., on Feb. 4, 2020, entitled "Composite Hybrid Cables and Methods of Manufacturing and Installing the Same," which is incorporated herein by reference in its entirety for all purposes.

TECHNICAL FIELD

This application is directed, in general, to wiring of structures for data and information transmittal, and more specifically, to composite hybrid cables and methods of manufacturing and installing such cables.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

As the number of connected devices and utilization of streaming services within various structures, e.g., a home or building, increase, the need to offload this traffic from a WiFi network to a wired network increases. It is established that a wired connection provides a consistently more reliable and stable connection than wireless connections, especially over time as changes within and to the structure can create points of interference for wireless signals. These factors among others combine to drive the desire for structured wiring within the home. Wired connections may be used for home networking, security/fire, audio, intercoms, surveillance cameras, home theaters, and the like.

Different cables often must be installed in a structure. For example, in a home desiring a home theater, cables must be run for audio, video, and other data. In the past, this has often involved running separate cables for each signal or use through walls or cable chases. In the home context, the cables are run through the walls and often must comply with codes, or local regulations, about the size of any apertures or notches in load bearing and non-load bearing studs. For example, in load bearing studs, under certain codes, the aperture may not exceed 25 percent of the stud's width; for a 2"×4" that would be a 1 and ⅜ inch diameter hole. There are aspects of the installation process and cables that may be improved.

DESCRIPTION OF THE DRAWINGS

Illustrative embodiments of the present invention are described in detail below with reference to the attached drawing figures, which are incorporated by reference herein and wherein:

FIG. 3 is a schematic perspective view, substantially in elevation, of an illustrative embodiment of a composite hybrid cable;

FIG. 4 is a schematic perspective view of the composite hybrid cable of FIG. 3 with a cross-section taken at line 4-4 in FIG. 3;

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Unless otherwise indicated, as used throughout this document, "or" does not require mutual exclusivity.

According to an illustrative embodiment, a composite hybrid cable is provided for allowing multiple constituent cables to run through a wall or wire chase of a structure in a single pass in an efficient manner. The composite hybrid cable provides differing data needs for a location. The illustrative embodiment allows the composite hybrid cable to be pushed, or alternatively pulled, through structures and to be utilized quickly. The ends of the constituent cables may be pre-terminated or connectorized. The ends may be staggered and covered to facilitate running the composite cable. This all is in contrast to the manner in which many cables are presently installed. Today, when an installer wires homes or buildings or any structure for data, the installer often buys the cable wire in bulk boxes and then the installer runs multiple separate cables by pulling each through the applicable structure. After running the individual cables, the cables are cut and the installer will later terminate them.

Figure 1:
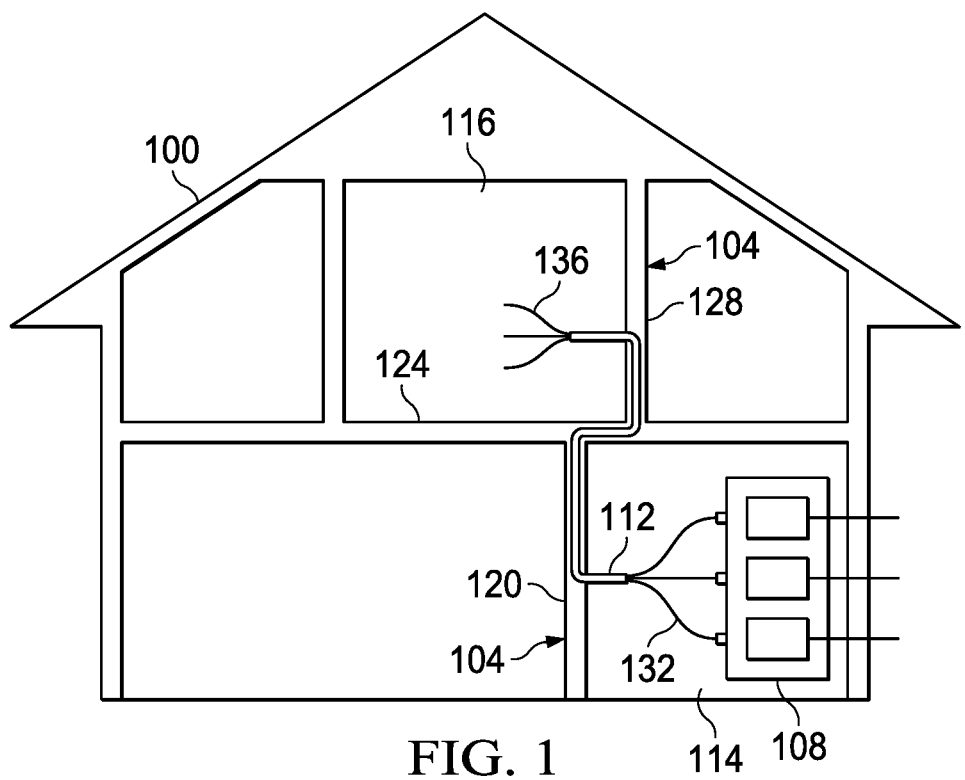
FIG. 1 is a schematic diagram in cross-sectional elevation of a structure, e.g., a house, with structured wiring.

Referring now to the drawings and initially to FIG. 1, a structure 100, e.g., a house or building, that is to receive structured wiring is presented. The wiring may facilitate networks of audio, video, data, telephone, television, home automation or security signals. The structure 100 includes a plurality of walls 104 forming rooms. One room has a structured networking panel (SNP) 108, which accepts cables from outside providers and distributes the signals. In order to provide signals from the structured networking panel 108 to other locations in the structure 100, a composite hybrid cable 112 is run from the panel 108 in a first room 114 or location to the desired locations, e.g., room 116.

The composite hybrid cable 112 is shown running in a first wall 120, a floor 124, and a second wall 128. The composite hybrid cable 112 has a first end 132 and a second end 136. The first end 132 couples to the structured networking panel 108 and the second end 136 couples to any number of devices, e.g., video, audio, security, etc., (as previously referenced) in room 116.

Figure 2:
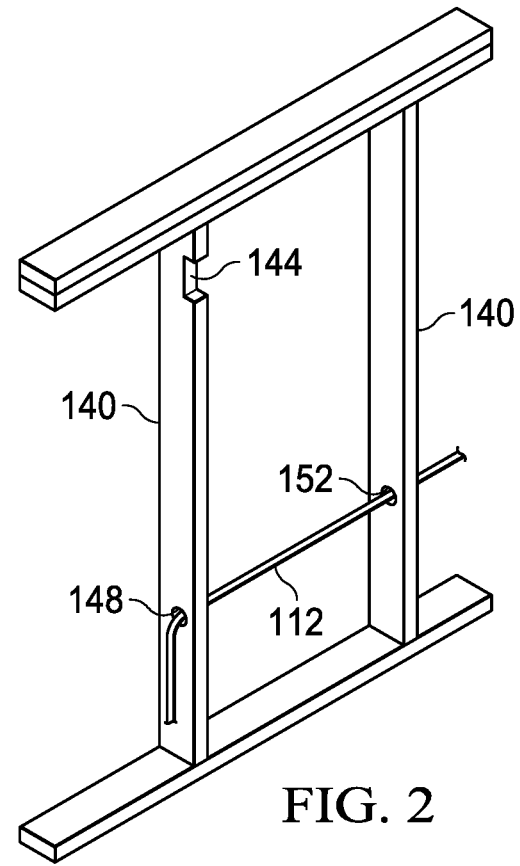
FIG. 2 is a schematic diagram of an interior portion of a wall having an illustrative embodiment of a composite hybrid cable.

Referring now primarily to FIG. 2, an interior portion of a wall, e.g., wall 128 (FIG. 1), is shown. In this view, one may see a plurality of studs 140 that include a notch 144 and a first aperture 148 and a second aperture 152. The composite hybrid cable 112 is shown running through the first aperture 148 and the second aperture 152. When installed the composite hybrid cable 112 may be run through the walls using the notches and apertures. In many locations there are restrictions on the size of the apertures and notches that may be applied to load-bearing and non-load bearing studs. For example, in some situations, the load-bearing studs may not have notches that exceed 25% of the particular stud's width (e.g., ⅞ inch for 2"×4") and the holes or apertures must be centered and not exceed 40% of the stud's width (e.g., 1⅜ inch for 2"×4"); the numbers are larger for non-load bearing studs, e.g., 40% for notches and 60% for centered apertures. In some instances, it is desirable to have a composite hybrid cable 112 that allows constituent cables to run in one pass and that is able to be pushed through the apertures 148, 152 or notches 144 instead of pulled. In some embodiments, the composite hybrid cable 112 is stiff enough to be pushed through multiple apertures or notches in studs in the wall. In some embodiments, the apertures in the studs 140 have a diameter at least 105% of a diameter of the composite hybrid cable 112 and less than 200% of the diameter of the composite hybrid cable 112 or dimension between. In some embodiments, the apertures in the studs 140 have a diameter at least 102% of a diameter of the composite hybrid cable 112 and less than 200% of the diameter of the composite hybrid cable 112 or dimension between. In some embodiments, the apertures in the studs 140 have a diameter at least 102% of a diameter of the composite hybrid cable 112 and less than 275% of the diameter of the composite hybrid cable 112 or dimension between.

Referring now primarily to FIG. 3, an illustrative embodiment of a composite hybrid cable 112 is presented. The composite hybrid cable 112 includes a plurality of constituent cables 156, each having a first end 160 and a second end 164. The constituent cables 156 may be any type of cable for carrying signals or low voltage—see, e.g., the examples given below in FIGS. 5-8. The plurality of constituent cables 156 is covered by an outer jacket 168. The outer jacket 168 covers at least a majority of the length of the plurality of constituent cables 156. The outer jacket 168 provides additional protection to the constituent cables 156. The outer jacket 168 has a first end 172 and a second end 176. In some embodiments, the outer jacket 168 has an outside diameter in the range of 0.5 to 1.25 inches. The outer jacket 168 may be formed from poly vinyl chloride (PVC) or from Halogen Free Polymers, PVDF, and Polyethylene and may have a thickness in the range of 0.75 mm to 2.5 mm.

The first end 160 of each of the plurality of constituent cables 156 extends beyond the first end 172 of the outer jacket 168. Likewise, the second end 164 of each of the plurality of constituent cables 156 extends beyond the second end 176 of the outer jacket 168. Each of the plurality of constituent cables 156 may have a connector 180 on the first end 160 or the second end 164. The connectors 180 may be installed at the factory. Factory installation of the connectors 180 may help reduce failures and provide more rapid installation in the field. Those skilled in the art will appreciate that many different connectors may be used depending on the application and cable type, including, RJ-45 Plugs, RJ-45 Jacks, F-type, and LC alternatives to include, BNC, RCA, SC, FC, ST.

Referring now primarily to FIG. 4 a cross-section in perspective of the composite hybrid cable 112 taken along line 4-4 in FIG. 3 is presented. One may see that in this illustrative embodiment the constituent cables 156 comprise five cables and a filler component 184. One skilled in the art will appreciate that numerous permutations of different cables may be included as constituent cables. In some illustrative embodiments, the constituent cables comprise: cables for video, data, voice, home security, alarm or A/V; a Cat 5e, Cat 6, Cat 6a and fiber; RG6 Coax and 18AWG+ speaker/audio cabling. In some embodiments, the constituent cables may comprise two Cat 5e Cables, two Cat 6 cables, a Multimode fiber cable and one or more filler components. In another embodiment, the constituent cables may comprise two Cat 5e Cables, two Cat 6 cables, an RG-6 Coax cable, and one or more filler components. In another illustrative embodiment, the constituent cables may comprise two Cat 5e Cables, two Cat 6 cables, an RG-6 Coax cable, and one or more filler components. Other cables and permutations and numbers of cables may be used. A few illustrative examples follow in FIGS. 5-8. In some embodiments, a single mode fiber may be used.

Figure 5:
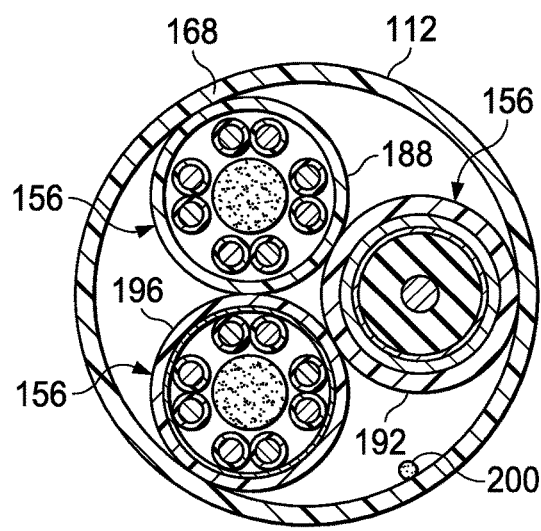
FIGS. 5-8 are schematic cross-sections of illustrative embodiments of composite hybrid cables.

FIG. 5 presents a cross section of a composite hybrid cable 112 wherein the constituent cables 156 include a Cat6 unshielded cable 188, an RG6 coax quad cable 192, and a Cat6A shielded cable 196. A rip cord 200 may also be included. The ripcord 200, which may be one or more ripcords, is operative to, when sufficient force is applied, rip through at least a portion of cable components, e.g., the cable jacket 168. The ripcord 200 can eliminate the need for cutting tools and may expedite installation.

Figure 6:
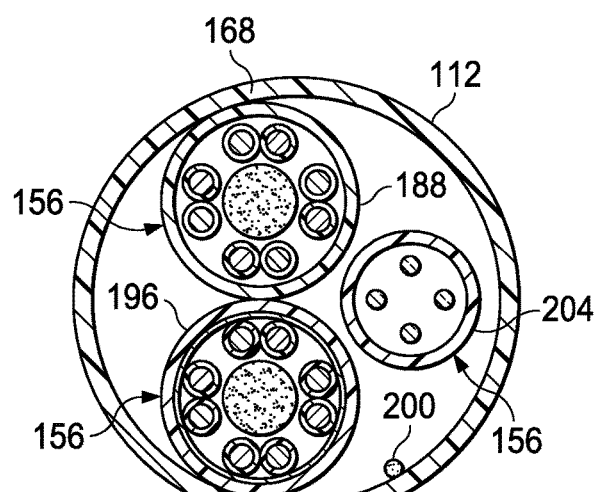

FIG. 6 presents a cross section of the composite hybrid cable 112 wherein the constituent cables 156 include a Cat 6 unshielded cable 188, a Multimode Fiber Cable 204, and a Cat 6a shielded cable 196. The rip cord 200 is also included.

Figure 7:
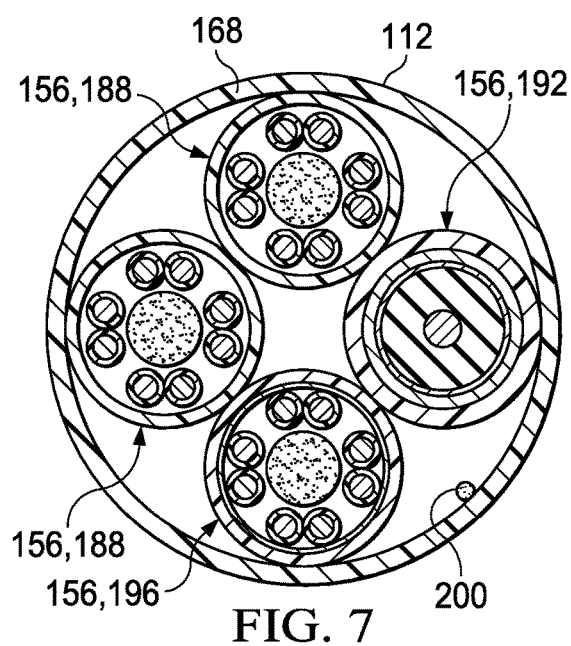

FIG. 7 presents a cross section of the composite hybrid cable 112 wherein the constituent cables 156 include two Cat6 unshielded cables 188, an RG6 coax quad cable 192, and a Cat6A shielded cable 196. A rip cord 200 is also included.

Figure 8:
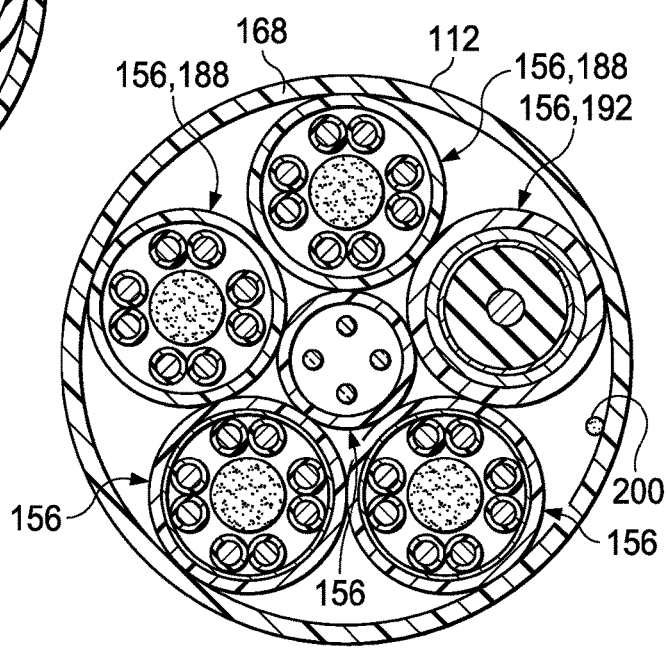

FIG. 8 presents a cross section of the composite hybrid cable wherein the constituent cables 156 include two Cat 6 unshielded cables 188, an RG6 coax quad cable 192, and two Cat 6a shielded cables 196. A rip cord 200 is also included. While Cat 6 cables are shown, it should be understood that other cables may be used, e.g., Cat 5e, Cat 6, Cat 6a, Cat 7 Ethernet cables.

In some illustrative embodiments, the combination of the plurality of constituent cables 156 and the outer jacket 168 are such that the composite hybrid cable 112 has a desired stiffness. The composite hybrid cable 112 is sufficiently stiff to be pushed rather than pulled through horizontal and vertical runs of the structure (100 in FIG. 1) including through notches (e.g., 144 in FIG. 1) or apertures (e.g., 148 in FIG. 1) in load-bearing and non-load bearing studs. At the same time, the composite hybrid cable is flexible enough to accommodate turns and corners and to return to a mostly linear state after having been flexed and to sufficiently navigate cable chases and runs. In some embodiments, the composite hybrid cable 112 is sufficiently stiff to be pushed through a one and ⅜ inch aperture in a stud to another aperture in an adjacent stud. In some embodiments, the composite hybrid cable 112 is sufficiently stiff to avoid pinching or over bending the Cat 6 or Cat 6a cable during installation.

Figure 9:
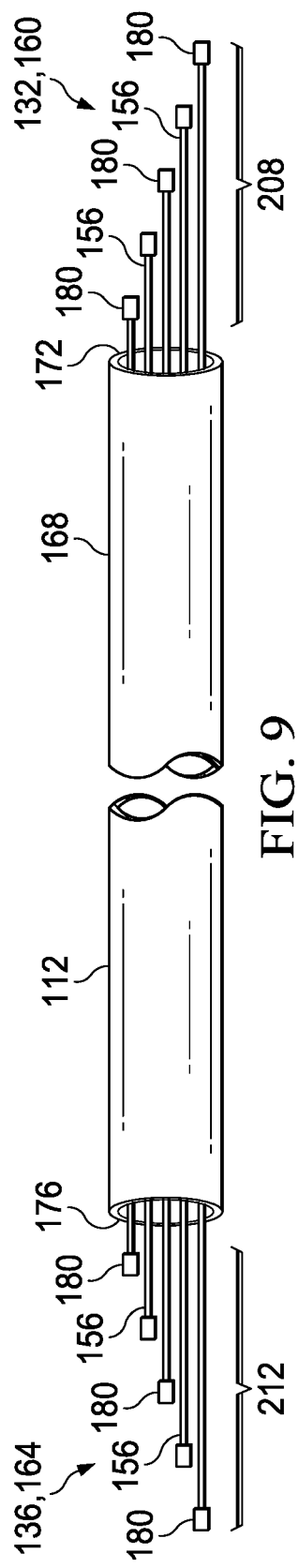
FIG. 9 is a schematic perspective view, substantially in elevation, of an illustrative embodiment of a composite hybrid cable.

Referring now primarily to FIG. 9, a side elevation of an illustrative embodiment of a composite hybrid cable 112 is presented. In this view, one may see that each of the plurality of constituent cables 156 may have a different length such that a first staggered array 208 of cable ends is formed on the first end 132 and a second staggered array 212 of cable ends is formed on the other end 136. In some embodiments, the staggered array may only be on one end.

Figure 10:
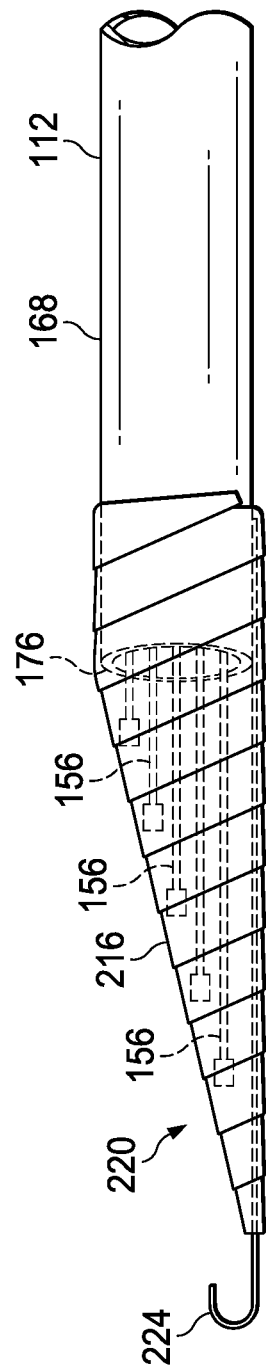
FIG. 10 is a schematic elevation view of one end of an illustrative embodiment of a composite hybrid cable.

Referring now primarily to FIG. 10 and also to FIG. 9, the second staggered array 212 of cable ends is covered with a wrapping material 216 to facilitate introduction of the composite hybrid cable 112 through one or more apertures (e.g., 148 or 152 in FIG. 2) or notches (e.g., 144 in FIG. 2) in a stud 140 (FIG. 2). The wrapping material 216 may be bubble wrap, shrink wrap, or tape, polypropylene, polyethylene or vinyl film with or without adhesive backing. The wrapped staggered array forms a tapered portion 220 (or tapered leading edge or protective sleeve), that makes it easier to direct the composite hybrid cable 112. In some embodiments, one of the constituent cables 156 may be sized to extend further out and be bent back to form a hook 224 if the cable 112 is to be pulled. In some embodiments, both ends may be covered with a wrapping material.

With reference to the figures, according to an illustrative embodiment, a method for installing a composite hybrid cable 112 in a structure 100 having walls 104 includes providing a composite hybrid cable 112, such as any of the illustrative embodiments presented above. In one embodiment, the composite hybrid cable 112 provided as part of the method includes a plurality of constituent cables 156, each having a first end 160 and a second end 164; and an outer jacket 168 covering at least a majority of a length of the plurality of constituent cables 156. In some embodiments, the outer jacket 168 covers all the length except the last fourteen inches. The outer jacket 168 has a first end 172 and a second end 176. The composite hybrid cable 112 is sufficiently stiff to be pushed through an aperture 148, 152 in a stud 140. The first end 160 of each of the plurality of constituent cables 156 extends beyond the first end 172 of the outer jacket 168 and wherein the second end 164 of each of the plurality of constituent cables 156 extends beyond the second end 176 of the outer jacket 168.

Each of the plurality of constituent cables 156 has a different length such that a first staggered array 208 of cable ends is formed on one end 132 with space between individual ends. The method further involves covering at least the first staggered array 208 or second staggered array 212 of cable ends with a wrapping material 216 to form a tapered lead 220 and pushing the tapered lead 220 of the composite hybrid cable 112 through one or more apertures 148, 152 or notches 144 in a plurality of studs 140 in one or more of the walls 104 of the structure 100. The plurality of constituent cables 156 may each have a connector 180 on each end. The outer jacket 168 may have an outside diameter in the range of 0.5 and 1.25 inches.

With reference to the figures, according to an illustrative embodiment, a method of manufacturing a composite hybrid cable 112 includes receiving a required or desired length of the composite hybrid cable 112 for a particular application; providing a plurality of constituent cables 156 each having a first end 160 and a second end 164; sizing the plurality of constituent cables 156 to have the required length within a margin of a couple feet, and wherein each of the plurality of constituent cables 156 has a different length such that the first ends 160 of the plurality of constituent cables 156 are not at the same location and the second ends 164 of the plurality of constituent cables 156 are not at the same location. The method may further include installing a termination connector 180 to each end of the plurality of constituent cables 156, and placing the composite hybrid cable 112 on a storage device, e.g., a reel or box.

The method may further include disposing a wrapping material 216 over the first end or second ends 164 of the constituent cables 156 to form a tapered leading edge 220. In some embodiments, the tapered leading edge 220 may extend more than 12 inches along the length of the composite hybrid cable 112.

As noted earlier, the composite hybrid cable 112 is sufficiently stiff to be pushed rather than pulled through horizontal and vertical runs of the structure (100 in FIG. 1) including through notches (e.g., 144 in FIG. 1) or apertures (e.g., 148 in FIG. 1) in load-bearing and non-load bearing studs. In one illustrative embodiment, the composite hybrid cable 112 is of adequate stiffness that the cable 112 remains on a horizontal plane (perpendicular to gravity) between holes in studs on 16" to 20" centers—the cable does not sag. In another illustrative embodiment, the composite hybrid cable 112 is sufficiently stiff to remain on a vertical plane (parallel to gravity) without flexing back on itself between holes in vertical risers between floors with ceiling heights of eight to ten feet. In one illustrative embodiment, the composite hybrid cable 112 is sufficiently stiff to allow the installer to push the unsupported cable either horizontally or vertically in wall recesses between wooden or metal framing of a residence or commercial building, or structure. Moreover, the pushing may be accomplished "blind" by the installer.

In terms of quantifying the stiffness, in one illustrative embodiment, composite hybrid cables of various stiffnesses are applied in a horizontal plane (perpendicular to gravity) between holes in studs on 16" to 20" without bending or sagging to an extent that the cable cannot be pushed to the next hole or applied in a vertical plane (parallel to gravity) without flexing back on itself between holes in vertical risers between floors with ceiling heights of eight to ten feet. Those sufficiently stiff hybrid, composite cables are then quantified with respect to their stiffness. This may be done in a variety of ways. A number of illustrative ways are referenced below.

In one instance, the composite hybrid cable is treated as a cantilevered beam for analysis. The composite hybrid cable is secured at one end and allowed to extend unsupported horizontally (perpendicular to gravity). Physically such measurements could be made by extending the cables (as cantilever beams) past a horizontal edge and measuring deflection of the cable (beam) from the horizontal plane relative to cable (beam) length.

$$\acute{O}_B = qL^4/(8EI)$$

Where: $\acute{O}_B$ is maximum deflection at the free end; q is the uniform distributed load; L is length of the cantilevered beam; E=Young's modulus; and I is Moment of Inertia.

Rearranging the equation and then solving for unknowns by plugging in length and deflection values, leaves two unknowns, namely, the Moment of Inertia (I) and Young's Modulus of Elasticity (E). The Moment of Inertia (I) depends on the body's mass distribution and the axis chosen, with larger moments requiring more torque to change the body's rate of rotation. In this instance, an axis is chosen at the fixed end of the beam (cable). Considering the cable as a uniform composition rod, (such as a CSM), the Moment of Inertia is calculated.

In another approach, a combination of Young's Modulus and the Moment of Inertia (EI) may be used and referred to as the "bending stiffness modulus." In one instance, the following steps are followed: (1) hybrid composite cables with desired performance are identified through use involving running in the horizontal and vertical planes as previously mentioned; (2) performing a cantilever test as referenced above with those cables, (3) comparing the deflection results with sample FRP cable strength rods with known (or determinable) Moment of Inertia (I) and Young's Modulus (E) characteristics; and (4) after finding FRP rods that bend over their length the same as the desired hybrid composite cables bend, the product of EI (Bending Stiffness Modulus) of the FRP rod and the desired cable will be the same and may be noted for future applications. That is, one may specify the acceptable range of EI (Bending Stiffness Modulus) for the desired applications in this way.

Still another approach is to use a one-point load method in which the hybrid composite cable is bent by applying a pre-defined sag at the midpoint between two supports. Another approach is to test the cable with the same set up, but in two stages with progressive bending and relaxation. Other approaches may be used as well.

The constituent cables 156 may all contribute to the stiffness that allows pushing of the composite hybrid cable 112. In some embodiments, the coaxial cable 192 may provide a majority of the stiffness. In this regard, if a coaxial cable is omitted for one reason or another, a stiffening member may be added into the composite hybrid cable 112 for the purpose of applying additional stiffness. In some embodiments, the stiffening member may be selected to achieve the desired stiffness and would appear just as another constituent cable 156 within the composite hybrid cable 112. The stiffening member may be for example a fiberglass reinforced plastic (RFP) cylinder member that forms a cable-like member. The stiffening member may also be added in some embodiments even when a coaxial cable is one of the constituent cables.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A composite hybrid cable for delivering signals within a structure, the composite hybrid cable comprising:
    a plurality of constituent cables, each having a first end and a second end;
    an outer jacket covering at least a majority of a length of the plurality of constituent cables, the outer jacket having a first end and a second end;
    wherein the composite hybrid cable is sufficiently stiff to be pushed through a first aperture in a first stud and a second aperture in a second stud, wherein the first stud and second stud are adjacent studs within a wall cavity and the first stud, and the second stud are spaced 16" to 20" apart on center;
    wherein the first end of the each of the plurality of constituent cables extends beyond the first end of the outer jacket and wherein the second end of each of the plurality of constituent cables extends beyond the second end of the outer jacket;
    a plurality of connectors;
    wherein each of the plurality of constituent cables has one of the plurality of connectors on the first end and has one of the plurality of connectors on the second end;
    wherein each of the plurality of constituent cables has a different length such that a first staggered array of cable ends is formed on one end and a second staggered array of cable ends is formed on another end;
    wherein the first staggard array of cable ends is covered with a wrapping material to form a wrapped staggard array to facilitate introduction through the first aperture in the first stud and the second aperture in the second stud; and
    wherein the wrapped staggard array forms a tapered leading edge.

2. The composite hybrid cable of claim 1, wherein the first aperture in the first stud has a diameter at least 105% of a diameter of the composite hybrid cable and less than 275% of the diameter of the composite hybrid cable.

3. The composite hybrid cable of claim 1, wherein the wrapping material is a shrink wrap.

4. The composite hybrid cable of claim 1, wherein the outer jacket has an outside diameter in a range of 0.5 and 1.25 inches.

5. The composite hybrid cable of claim 1, wherein the outer jacket has an outside diameter in the range of 0.5 and 1.25 inches and the first aperture in the first stud has a diameter of 1 and $\frac{3}{8}$ inches and the second aperture in the second stud has a diameter of 1 and $\frac{3}{8}$ inches.

6. The composite hybrid cable of claim 1, wherein the plurality of constituent cables comprises: a plurality of Cat 5e cables, a plurality of Cat 6 cables, at least one Multimode fiber cable, and a filler component.

7. The composite hybrid cable of claim 1, wherein the plurality of constituent cables comprises: a plurality of Cat 5e cables, a plurality of Cat 6 cables, at least one RG-6 Coax cable, and a filler component.

8. The composite hybrid cable of claim 1, wherein the plurality of constituent cables comprises: a plurality of Cat 5e cables, a plurality of Cat 6a cables, at least one RG-6 Coax cable, and a filler component.

9. The composite hybrid cable of claim 1, wherein the plurality of connectors comprises a plurality of factory-installed connectors.

10. The composite hybrid cable of claim 1, wherein each of the plurality of constituent cables has a different length such that the connectors on the first ends of the constituent cables are at different locations and that the connectors on the second ends of the constituent cables are at different locations.

11. The composite hybrid cable of claim 1, wherein the plurality of constituent cables comprises a Cat 6 or Cat 6a cable, and wherein the composite hybrid cable is sufficiently stiff to avoid pinching or over bending the Cat 6 or Cat 6a cable.

12. The composite hybrid cable of claim 1, wherein the composite hybrid cable has stiffness such that when the composite hybrid cable is applied in a vertical plane, which is parallel to gravity, the composite hybrid cable does not flex back on itself between holes in vertical risers between floors with ceiling heights between eight and ten feet.

13. A method for installing a composite hybrid cable in a building having a wall, the method comprising:
    wherein the wall comprises a first stud and a second stud;
    providing a composite hybrid cable comprising:
        a plurality of constituent cables, each having a first end and a second end, an outer jacket covering at least a majority of a length of the plurality of constituent cables, the outer jacket having a first end and a second end, wherein the composite hybrid cable is sufficiently stiff to be pushed through a first aperture in the first stud and a second aperture in the second stud, wherein the first stud and second stud are adjacent studs within a wall cavity of the wall and the first stud, and the second stud are spaced 16" to 20" apart on center, wherein the first end of the each of the plurality of constituent cables extends beyond the first end of the outer jacket and wherein the second end of each of the plurality of constituent cables extends beyond the second end of the outer jacket, a plurality of connectors, wherein each of the plurality of constituent cables has one of the plurality of connectors on the first end and has one of the plurality of connectors on the second end, wherein each of the plurality of constituent cables has a different length such that a first staggered array of cable ends is formed on one end and a second staggered array of cable ends is formed on another end, wherein the first staggard array of cable ends is covered with a wrapping material to form a wrapped staggard array to facilitate introduction through the first aperture in the first stud and the second aperture in the second stud, and wherein the wrapped staggard array forms a tapered leading edge; and pushing the tapered leading edge of the composite hybrid cable through the first aperture in the first stud and the second aperture in the second stud in the wall.

14. The method of claim 13, wherein the outer jacket has an outside diameter in the range of 0.5 and 1.25 inches.

15. A method of manufacturing a composite hybrid cable, the method comprising:

receiving a required length for the composite hybrid cable to be manufactured;

providing a plurality of constituent cables each having a first end and a second end;

sizing the plurality of constituent cables to have the required length within a margin of a couple feet and wherein each of the plurality of constituent cables has a different length such that the first ends of the plurality of constituent cables are not at the same location and the second ends of the plurality of constituent cables are not at the same location and such that a first staggered array of cable ends is formed on one end and a second staggered array of cable ends is formed on another end;

covering at least a majority of a length of the plurality of constituent cables with an outer jacket covering;

covering the first staggard array of cable ends with a wrapping material to form a wrapped staggard array;

installing a plurality of connectors to the plurality of constituent cables;

placing the composite hybrid cable on a storage device; and whereby the composite hybrid cable is formed that comprises:

the plurality of constituent cables, the outer jacket, wherein the outer jacket has a first end and a second end, wherein the composite hybrid cable is sufficiently stiff to be pushed through a first aperture in a first stud and a second aperture in a second stud, wherein the first stud and second stud are adjacent studs within a wall cavity and the first stud, and the second stud are spaced 16" to 20" apart on center, wherein the first end of the each of the plurality of constituent cables extends beyond the first end of the outer jacket and wherein the second end of each of the plurality of constituent cables extends beyond the second end of the outer jacket;

the plurality of connectors, wherein each of the plurality of constituent cables has one of the plurality of connectors on the first end and has one of the plurality of connectors on the second end, wherein each of the plurality of constituent cables has a different length such that the first staggered array of cable ends is formed on one end and the second staggered array of cable ends is formed on another end, wherein the first staggard array of cable ends is covered with the wrapping material to form a wrapped staggard array to facilitate introduction through the first aperture in the first stud and the second aperture in the second stud, and wherein the wrapped staggard array forms a tapered leading edge.

16. The method of manufacturing of claim 15, wherein the tapered leading edge is greater than 12 inches in length.

17. The method of manufacturing of claim 15, wherein the tapered leading edge is greater than 2 inches in length.

* * * * *